(12) United States Patent
Kikuchi et al.

(10) Patent No.: US 8,611,433 B2
(45) Date of Patent: Dec. 17, 2013

(54) INFORMATION PROCESSING APPARATUS AND VIDEO DECODING METHOD OF INFORMATION PROCESSING APPARATUS

(75) Inventors: Yoshihiro Kikuchi, Ome (JP); Tatsuro Fujisawa, Ome (JP); Yuji Kawashima, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1822 days.

(21) Appl. No.: 11/711,844

(22) Filed: Feb. 28, 2007

(65) Prior Publication Data

US 2007/0201555 A1 Aug. 30, 2007

(30) Foreign Application Priority Data

Feb. 28, 2006 (JP) ................................. 2006-053694

(51) Int. Cl.
*H04N 7/12* (2006.01)
*H04N 11/02* (2006.01)
*H04N 11/04* (2006.01)

(52) U.S. Cl.
USPC ............. 375/240.29; 375/240.03; 375/240.12

(58) Field of Classification Search
USPC .................................................... 375/240.29
See application file for complete search history.

(56) References Cited

U.S. PATENT DOCUMENTS

| 6,353,683 | B1 | 3/2002 | Horiike |
| 6,393,393 | B1 * | 5/2002 | Kawahara ..................... 704/229 |
| 7,310,371 | B2 * | 12/2007 | Cote et al. ................ 375/240.15 |
| 7,372,999 | B2 * | 5/2008 | Oneda et al. .................. 382/232 |

| 2001/0017977 | A1 | 8/2001 | Umeda |
| 2003/0206587 | A1 * | 11/2003 | Gomila ..................... 375/240.12 |
| 2006/0126725 | A1 * | 6/2006 | Zeng et al. ............... 375/240.03 |

FOREIGN PATENT DOCUMENTS

| JP | 11-239352 | 8/1999 |
| JP | 11-346368 | 12/1999 |
| JP | 2005-33724 | 2/2005 |

OTHER PUBLICATIONS

Japanese Office Action dated Jun. 15, 2010 for Appln. No. 2006-053694.
ITU-T Recommendation H.264 (2003), "Advanced Video Coding for generic audiovisual services".
ISO/IEC 14496-10 (2003); "Information Technology, Coding of Audio-Visual Objects-Part 10; Advanced Video Coding".

\* cited by examiner

*Primary Examiner* — Kambiz Zand
*Assistant Examiner* — Narciso Victoria
(74) *Attorney, Agent, or Firm* — Pillsbury Winthrop Shaw Pittman, LLP

(57) ABSTRACT

According to one embodiment, an information processing apparatus which includes a video decoding processing to decode a compressed and encoded video image stream by software, selectively generates one of an intra prediction image and an inter prediction image on the basis of an encoding mode of a decoding object from the video stream and a decoded image thereof, generates a residual decoded image based on a quantization parameter of a decoding object from the video stream, generates a decoded image by adding the generated prediction image and the residual decoded image, applies a deblocking filter process, extracts information on an encoding mode from the video image stream to determine whether or not inter prediction processes for generating the inter prediction image should be simplified, simplifies the inter prediction process step-by-step on the basis of the result of the determination.

13 Claims, 15 Drawing Sheets

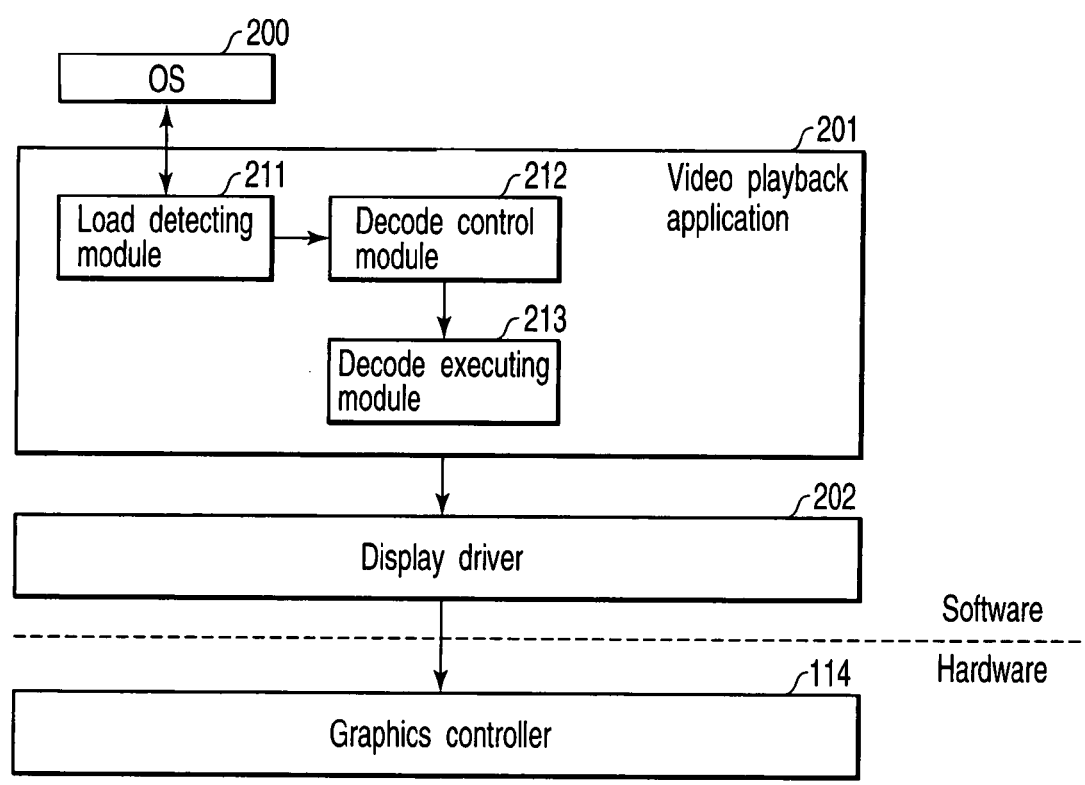
F I G. 3

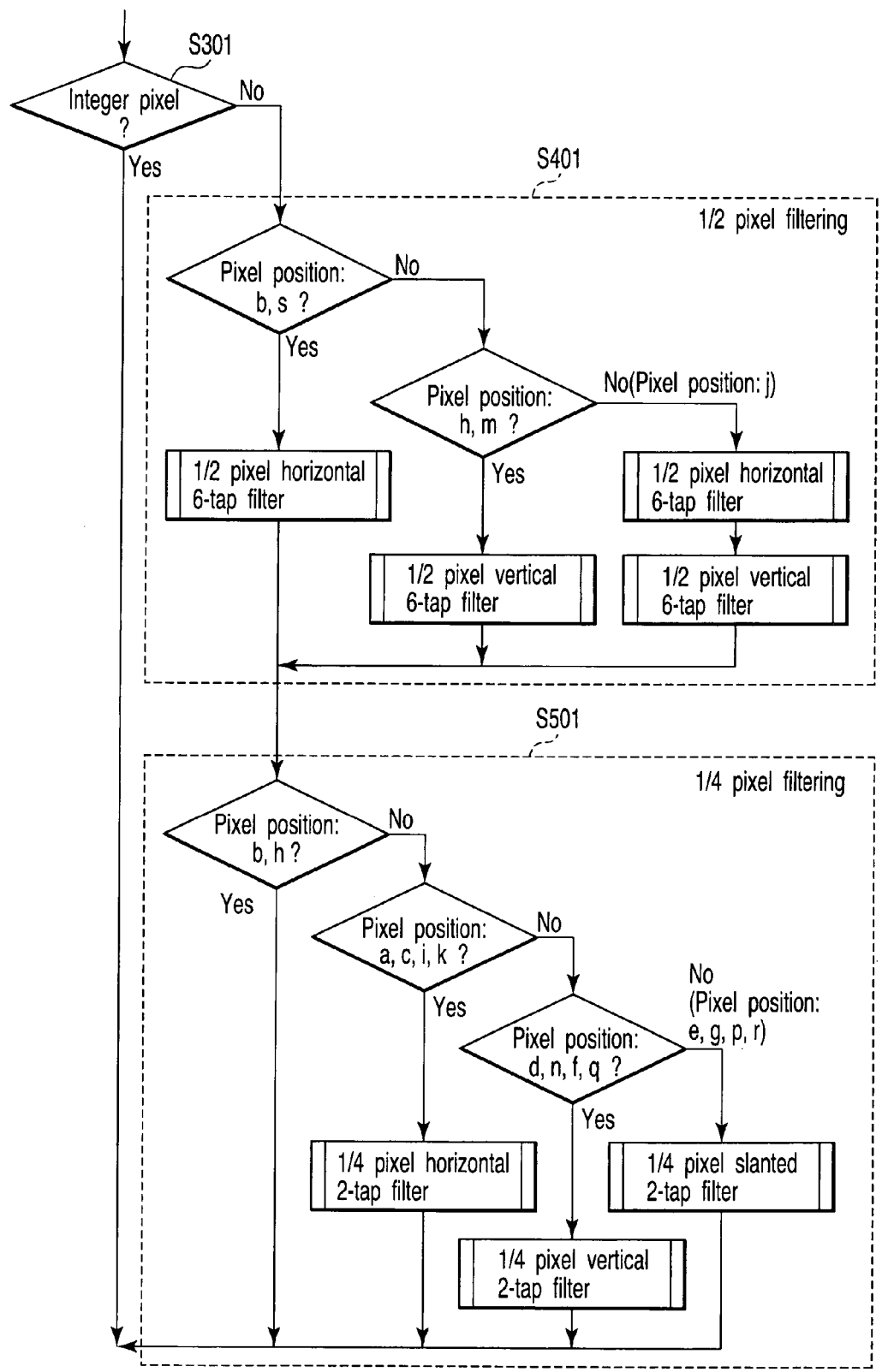
F I G. 14

US 8,611,433 B2

INFORMATION PROCESSING APPARATUS AND VIDEO DECODING METHOD OF INFORMATION PROCESSING APPARATUS

CROSS-REFERENCE TO RELATED APPLICATIONS

This application is based upon and claims the benefit of priority from Japanese Patent Application No. 2006-053694, filed Feb. 28, 2006, the entire contents of which are incorporated herein by reference.

BACKGROUND

1. Field

One embodiment of the invention relates to an information processing apparatus in which video decoding processing for decoding a compressed and encoded video stream is achieved by software, and a video decoding method thereof.

2. Description of the Related Art

As standard technologies for encoding a video stream, H.261 and H.263 of the International Telecommunication Union Telecommunication Standardization Sector (ITU-T), Moving Picture Experts Group (MPEG)-1, MPEG-2, and MPEG-4 of the International Organization for Standardization (ISO), and the like, have been developed. As a next-generation video encoding method in which the technologies such as H.261 to H.263, MPEG-1 to MPEG-4, and the like have been succeeded, and further developed, there is the H.264 which has been standardized by the ISO and the ITU jointly (refer to ITU-T Recommendation H.264 (2003), "Advanced Video Coding for generic audiovisual services"|ISO/IEC 14496-10: 2003, "Information technology, Coding of audio-visual objects—Part 10: Advanced video coding", and H.264/AVC textbook (Impress Communications Corporation)).

However, while on the other hand the H.264 achieves a high compression ratio, it poses a serious problem because it is required a high computing processing capability when reproducing a video image with a high resolution, especially, like an HD-DVD.

On the other hand, personal computers (PCs) having the same AV functions as those of audio-video (AV) equipment such as digital versatile disc (DVD) players and TV devices have been developed. In such a personal computer, a software decoder which decodes a compressed and encoded video stream by software is used. By the use of a software decoder, it is possible to decode a compressed and encoded video stream by a processor (CPU) without dedicated hardware being provided thereto.

However, in an information processing apparatus such as the foregoing personal computer, in accomplishing video decoding processing according to the standardization specifications, etc., based on the H.264, in a video decoding apparatus with such standardization specifications based on the H.264, compensating movements of inter predictions accounting to the whole of decoding processing being large in quantity, there is a possibility that such a disadvantage occurs that decoding processing in real time cannot be made in time, frames are missed, and movements of objects are extremely become slow, if the load on the whole of the decoding apparatus is heavy. Specifically, in an information processing apparatus driven by a battery, such as a notebook personal computer, increasing a load in a battery driven mode consumes a large volume of electric power and shortens a driving time extremely.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

FIG. 3 is a block diagram showing a functional configuration example of a video playback application program for use in the computer of FIG. 1;

FIG. 14 is a flowchart showing a processing procedure of a determination process of integer pixels (S301), a ½ pixel filtering process 401, and a ¼ pixel filtering process 501, as an ordinary decoding process for the processing contents shown in FIG. 13;

DETAILED DESCRIPTION OF THE INVENTION

Various embodiments according to the invention will be described hereinafter with reference to the accompanying drawings. In general, according to one embodiment of the invention, an information processing apparatus which includes a video decoding processing to decode a compressed and encoded video image stream by software, and a control process based on load information and battery driving information, comprises: a prediction decoding unit which selectively generates one of an intra prediction image and an inter prediction image based on an encoding mode of a decoding object from the video stream and decoded images thereof; a residual decoding unit which generates a residual decoded image based on a quantization parameter of a decoding object from the video stream; an adding unit which generates a decoded image by adding one of an intra prediction image and an inter prediction image selectively generated by the prediction decoding unit, and a residual decoded image generated by the residual decoding unit; a filter process unit which applies deblocking filter process for reducing a block distortion onto a decoded image generated by the adding unit; a determining unit which extracts information on an encoding mode from the video stream to determine whether or not inter prediction processes for generating the inter prediction image should be simplified on the basis of the extracted information and the load information; and a switching unit which selectively switches whether the determining unit and the simplifying unit should be enabled or disabled.

Hereinafter, embodiments of the present invention will be described with reference to the drawings.

First, a configuration example of an information processing apparatus according to one embodiment of the present invention will be described with reference to FIGS. 1 and 2. The information processing apparatus is realized as, for example, a notebook type personal computer 10.

Figure 1:
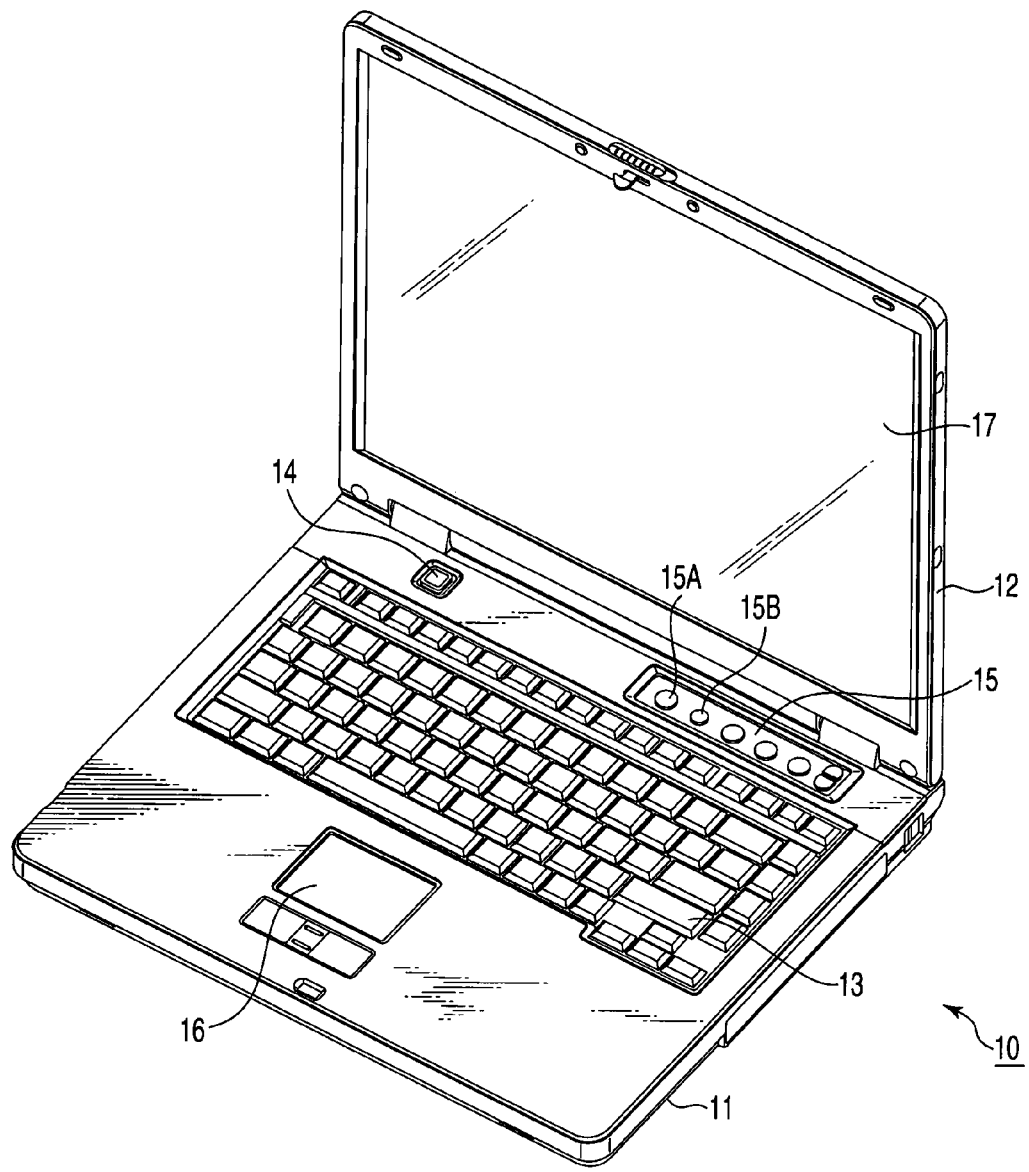
FIG. 1 is a perspective view showing an example of an outside of a computer according to one embodiment of the present invention.

FIG. 1 is a front view showing a state in which a display unit of the notebook type personal computer 10 is opened as seen from the front. The computer 10 is composed of a computer main body 11 and a display unit 12. A display device composed of a liquid crystal display (LCD) 17 is built into the display unit 12, and a display screen of the LCD 17 is positioned at substantially the center of the display unit 12.

The display unit 12 is attached so as to be freely rotatable between an open position and a closed position with respect to the computer main body 11. The computer main body 11 has a thin box form case. A keyboard 18, a power button 14 for turning the computer 10 power-on/off, an input operation panel 15, a touch pad 16, and the like are arranged on the upper surface of the computer main body 11.

The input operation panel 15 is an input device for inputting an event corresponding to a pushed button, and has a plurality of buttons for respectively starting a plurality of functions. A TV starting button 15A and a digital versatile disc (DVD) starting button 15B as well are included in the group of these buttons. The TV starting button 15A is a button for starting a TV function for carrying out playback and recording of broadcast program data such as a digital TV broadcast program. When the TV starting button 15A is pressed down by a user, an application program for executing the TV function is automatically started. The DVD starting button 15B is a button for playing back video contents recorded on a DVD. When the DVD starting button 15B is pressed down by a user, an application program for playing back video contents is automatically started.

Next, a system configuration example of the computer 10 will be described with reference to FIG. 2.

Figure 2:
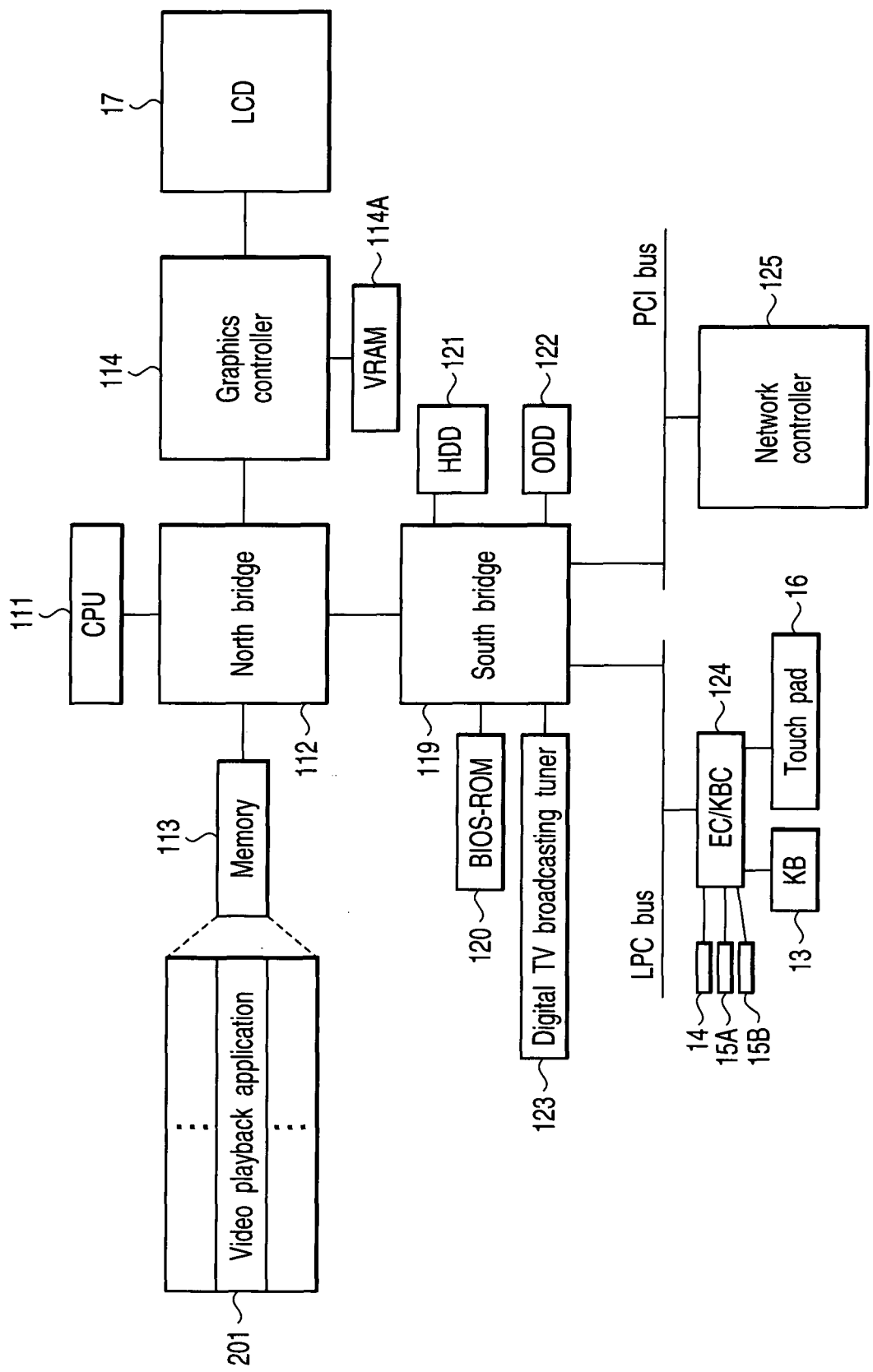
FIG. 2 is a block diagram showing a system configuration example of the computer of FIG. 1.

As shown in FIG. 2, the computer 10 has a CPU 111, a north bridge 112, a main memory 113, a graphics controller 114, a south bridge 119, a BIOS-ROM 120, a hard disk drive (HDD) 121, an optical disk drive (ODD) 122, a digital TV broadcasting tuner 123, an embedded controller/keyboard controller IC (EC/KBC) 124, a network controller 125, and the like.

The CPU 111 is a processor provided for controlling operations of the computer 10, and executes various application programs such as an operating system (OS) and a video playback application program 201 which are loaded from the hard disk drive (HDD) 121 to the main memory 113.

The video playback application program 201 is software for decoding and playing back compressed and encoded video data. The video playback application program 201 is a software decoder according to the H.264/AVC standard. The video playback application program 201 has a function for decoding a video stream compressed and encoded in an encoding method defined by the H.264/AVC standard (for example, a digital TV broadcast program received by the digital TV broadcasting tuner 123, vide contents according to the high definition (HD) standard read from the optical disk drive (ODD) 122, and the like).

As shown in FIG. 3, the video playback application program 201 has a load detecting module 211, a decode control module 212, and a decode executing module 213.

The decode executing module 213 is a decoder for executing decode processing defined by the H.264/AVC standard. The load detecting module 211 is a module for detecting a load on the computer 10. The load detecting module 211 detects a current loading dose of the computer 10 by inquiring of an operating system (OS) 200 about a current load of the computer 10. A loading dose of the computer 10 is determined on the basis of, for example, a usage rate of the CPU 111.

Further, a loading dose of the computer 10 can be determined on the basis of a combination of a usage rate of the CPU 111 and a usage rate of the memory 113. Usually, a memory of a certain definite size or more is required for executing a software decoder smoothly. When a usage rate of the memory in the system is made higher, decoding performance of the software decoder is deteriorated due to paging of the OS. Therefore, by detecting a loading doze of the computer 10 on the basis of a combination of a usage rate of the CPU 111 and a usage rate of the memory 113, it is possible to precisely determine whether or not a current loading doze of the computer 10 is a loading dose which poses a problem for executing the software decoder (in a high-loaded state).

The decode control module 212 controls contents of decode processing executed by the decode executing module 213 in accordance with a load on the computer 10 detected by the load detecting module 211.

Specifically, when a loading doze of the computer 10 is less than or equal to a reference value determined in advance, the decode control module 212 controls contents of decode processing to be executed by the decode executing module 213 such that the decode processing defined by the H.264/AVC standard is executed by the CPU 111. On the other hand, when a loading doze of the computer 10 is larger than the reference value (in a high-loaded state), the decode control module 212 controls contents of decode processing to be executed by the decode executing module 213 such that a part of the decode processing defined by the H.264/AVC standard is replaced with SKIPPED or simplified processing.

Video data decoded by the video playback application program 201 are sequentially written into a video memory 114A of the graphics controller 114 via a display driver 202. Consequently, the decoded video data are displayed on the LCD 17. The display driver 202 is software for controlling the graphics controller 114.

Further, the CPU 111 executes a system BIOS (Basic Input Output System) stored in the BIOS-ROM 120 as well. The system BIOS is a program for controlling hardware.

The north bridge 112 is a bridge device for connecting a local bus of the CPU 111 and the south bridge 119. A memory controller for access-controlling the main memory 113 as well is built in the north bridge 112. Further, the north bridge 112 further has a function of executing communication with the graphics controller 114 via an AGP (accelerated graphics port) bus or the like.

The graphics controller 114 is a display controller for controlling the LCD 17 used as a display monitor of the computer 10. The graphics controller 114 generates a display signal to be transmitted to the LCD 17 from image data written in a VRAM (video random access memory) 114A.

The south bridge 119 controls respective devices on a low pin count (LPC) bus, and respective devices on a peripheral component interconnect (PCI) bus. Further, the south bridge 119 has an integrated drive electronics (IDE) controller for controlling the HDD 121 and the ODD 122 built-in. Moreover, the south bridge 119 has a function for controlling the digital TV broadcasting tuner 123 and a function for access-controlling the BIOS-ROM 120 as well.

The HDD 121 is a storage device which stores various software and data. The optical disk drive (ODD) 123 is a drive unit for driving a storage medium such as a DVD on which video contents are stored. The digital TV broadcasting tuner 123 is a receiving apparatus for receiving broadcast program data such as a digital TV broadcast program from the outside.

The embedded controller/keyboard controller IC (EC/KBC) 124 is a one-chip microcomputer in which an embedded controller for managing electric power and a keyboard controller for controlling the keyboard (KB) 13 and the touch pad 16 are integrated. The embedded controller/keyboard controller IC (EC/KBC) 124 has a function of turning the computer 10 power-on/power-off in accordance with an operation of the power button 14 by a user. Moreover, the embedded controller/keyboard controller IC (EC/KBC) 124 can turn the computer 10 power-on in accordance with an operation of the TV starting button 15A or the DVD starting button 15B by a user. The network controller 125 is a communication device which executes communication with an external network such as, for example, the Internet.

Next, a functional configuration of the software decoder achieved by the video playback application program will be described with reference to FIG. 4.

Figure 4:
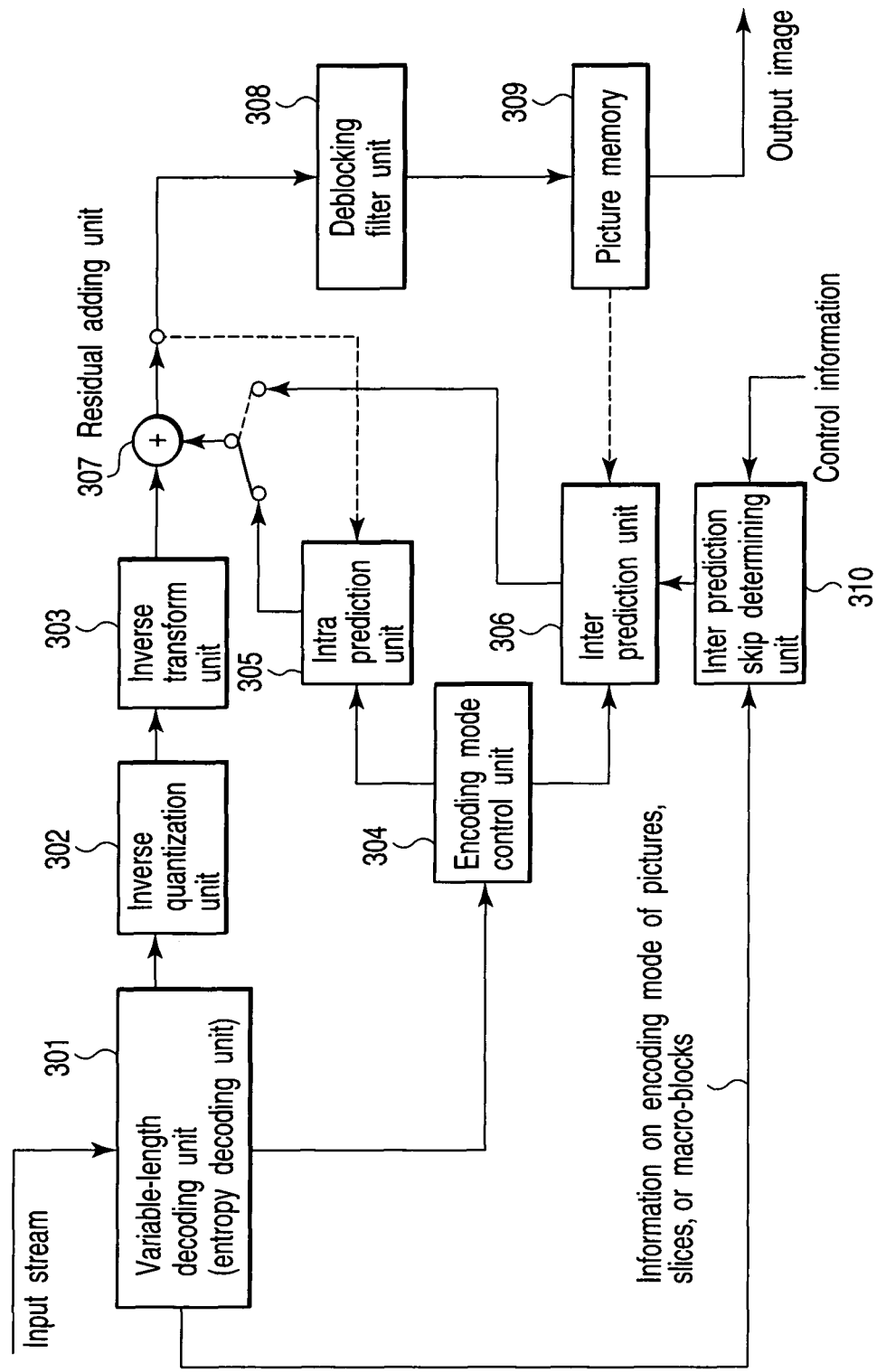
FIG. 4 is a block diagram showing a configuration example in the case where the invention is applied to video decoding processing according to standardization specifications based on the H.264 as a software decoder achieved by the video playback application program of FIG. 3.

FIG. 4 is a block diagram showing a structural example when the present invention is applied to a video decoding apparatus in accordance with standardization specifications based on the H.264, as one embodiment of a video decoding apparatus relating to the present invention. In FIG. 4, an input stream is a video stream which has been compressed and encoded in accordance with the H.264 standard, and is transmitted to a variable-length decoding unit (called an entropy decoding unit as well) 301. The variable-length decoding unit 301 encodes an input stream so as to be a varying length, and generates syntax. An inverse quantization unit 302 and an inverse transform unit 303 generate a residual image from a result of encoding of a video encoded stream based on the generated syntax.

An encoding mode control unit 304 discriminates an encoding mode based on the input stream from the variable-length decoding unit 301, and selectively controls to drive a intra prediction unit 305 and a inter prediction unit 306 based on a result of discrimination. The intra prediction unit 305 and the inter prediction unit 306 respectively generate predicted images in a screen and between screens in accordance with an encoding mode designated by the encoding mode control unit 304. Generated predicted images are selectively transmitted to a residual adding unit 307. The residual adding unit 307 adds a predicted image from the intra prediction unit 305 or the inter prediction unit 306, and a residual image from the inverse transform unit 303 to generate a decoded image. The generated decoded image is provided as a reference in the intra prediction unit 305.

The decoded image obtained from the residual adding unit 307 is transmitted to a deblocking filter unit 308, and a reconstructed image is generated through the filter processing here. The reconstructed image is temporarily stored in a picture memory (frame memory) 309, referred in the inter prediction unit 306, then, output to a display system in turn as a decoding result.

An inter prediction skip determining unit 310 extracts information related to an encoding mode of pictures, slices, or macro-blocks from the variable-length decoding unit 301 on the basis of the control information from a main control unit (not shown) to determine whether or not the prediction processing at the inter prediction unit 306 should be skipped. Its determining method will be described later. Here, for applying the deblocking filter processing, the decoded image is input to the deblocking filter unit 308 to generate the reconstructed image through the filer processing and stored in the picture memory 309. If the deblocking filter processing is not applied, the decoded image is stored directly in the picture memory 309 as the reconstructed image. The reconstructed image stored in the picture memory 309 is output as an output image and also refereed in the inter prediction unit 306.

Figure 5:
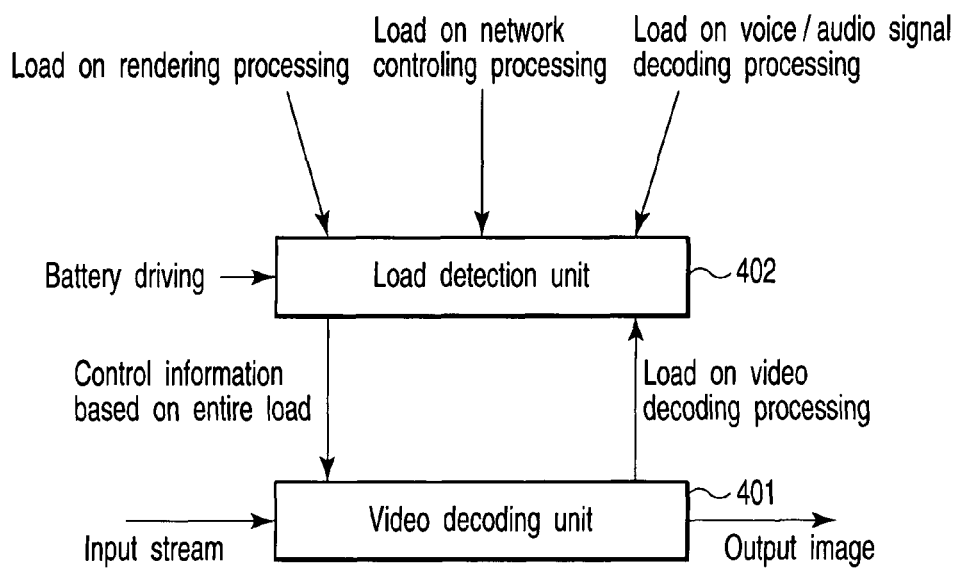
FIG. 5 is a block diagram showing a structural example of a content information processing system including the video decoding apparatus shown in FIG. 4 as a video decoding unit.

FIG. 5 shows a structural example of a content information processing system including the video decoding apparatus shown in FIG. 4 as a video decoding unit 401. This system further includes a load detection unit 402. The load detection unit 402 acquires information on processing load in video decoding processing from the video decoding unit 401 and information on the other processing load of the system in decoding processing for voice/audio signals, rendering processing, and the like. The load detection unit 402 calculates an entire load based on the input information on load and notifies the video decoding unit 401 of the information on load.

In battery driving, the load detection unit 402 receives, for example, the remaining quantity notification of the battery, and if the notified quantity is less than the allowable remaining quantity, the detection unit 402 makes a video image decoding unit 401 execute skip control of its processing regardless of the state of the processing load. In AC power source driving, it is preferable to improve image quality by automatically turning off the skip of the processing.

In the video image decoding unit 401, the load information is input to the inter prediction skip determining unit 310 in the video decoding unit 401. A basic processing example of the determining unit 310 will be shown in GIG. 6.

Figure 6:
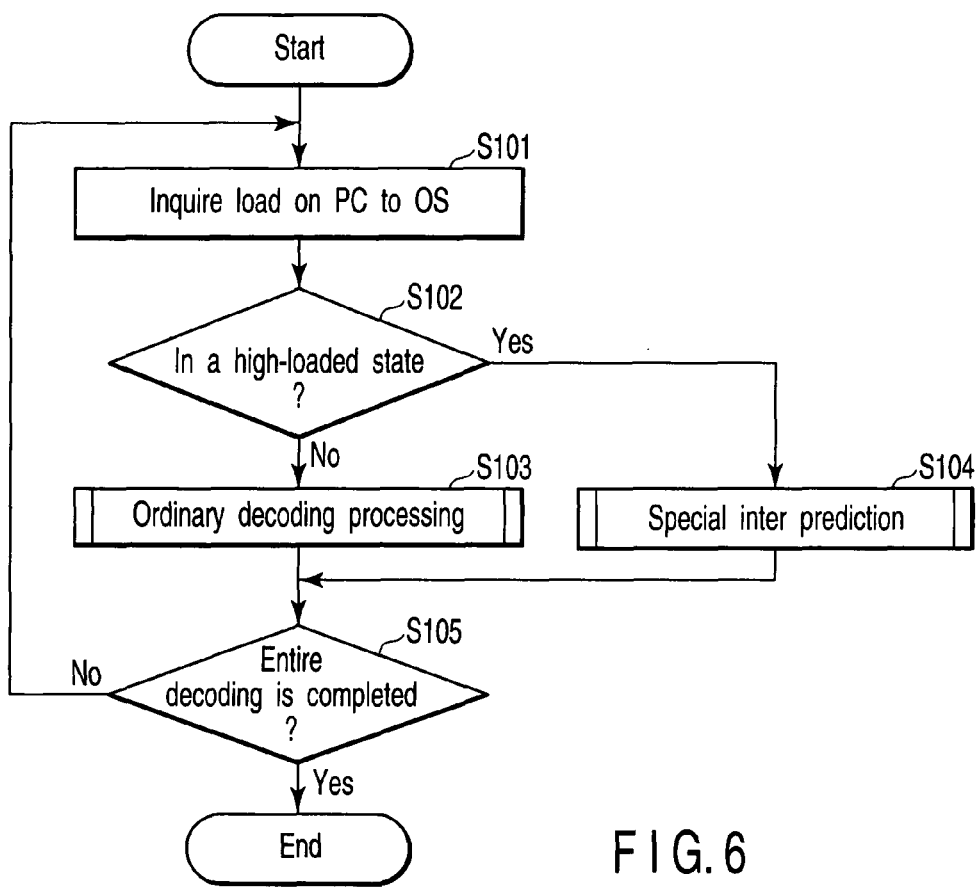
FIG. 6 is a flowchart showing a basic processing example of an inter prediction skip determining unit in FIG. 4.

In the processing example shown in FIG. 6, when the start of the skip determination is instructed firstly in decode processing, the determining unit 310 inquires the load of a PC to an OS (S101) to determine whether the load is a high or not (S102). It is presumed that if it is not in a high-loaded state, the determining unit 310 performs ordinary decode processing (S103), and if it is in the high-loaded state, the determining unit 310 performs decoding processing through special inter prediction (S104). Finally, the determining unit 310 repeats the aforementioned processes until all video images decoded completely (S105).

Here, in this embodiment, it is supposed that the determining unit 310 detects various types of processing to be implemented in the entire system, and if the load is in the high-loaded state, the determining unit 310 reduces the decode processing amounts by adoptively skipping the processing in the inter prediction unit 306. However, skipping and simplifying the inter prediction processing without reserve poses extreme deterioration in the image. Therefore, the determining unit 310 decreases the processing amounts by preferentially simplifying the B pictures (B slices, bi-prediction portions) which increase the processing amounts in the inter prediction unit 306 to reduce only the spots at which the processing amounts are specifically increased in response to the encoding mode information of the pictures, slices, or macro-blocks while suppressing the deterioration in image quality minimally.

Hereinafter, specific processing operations of the inter prediction skip determining unit 310 which accomplishes the foregoing processing will be described with reference to FIG. 7 through FIG. 12.

Figure 7:
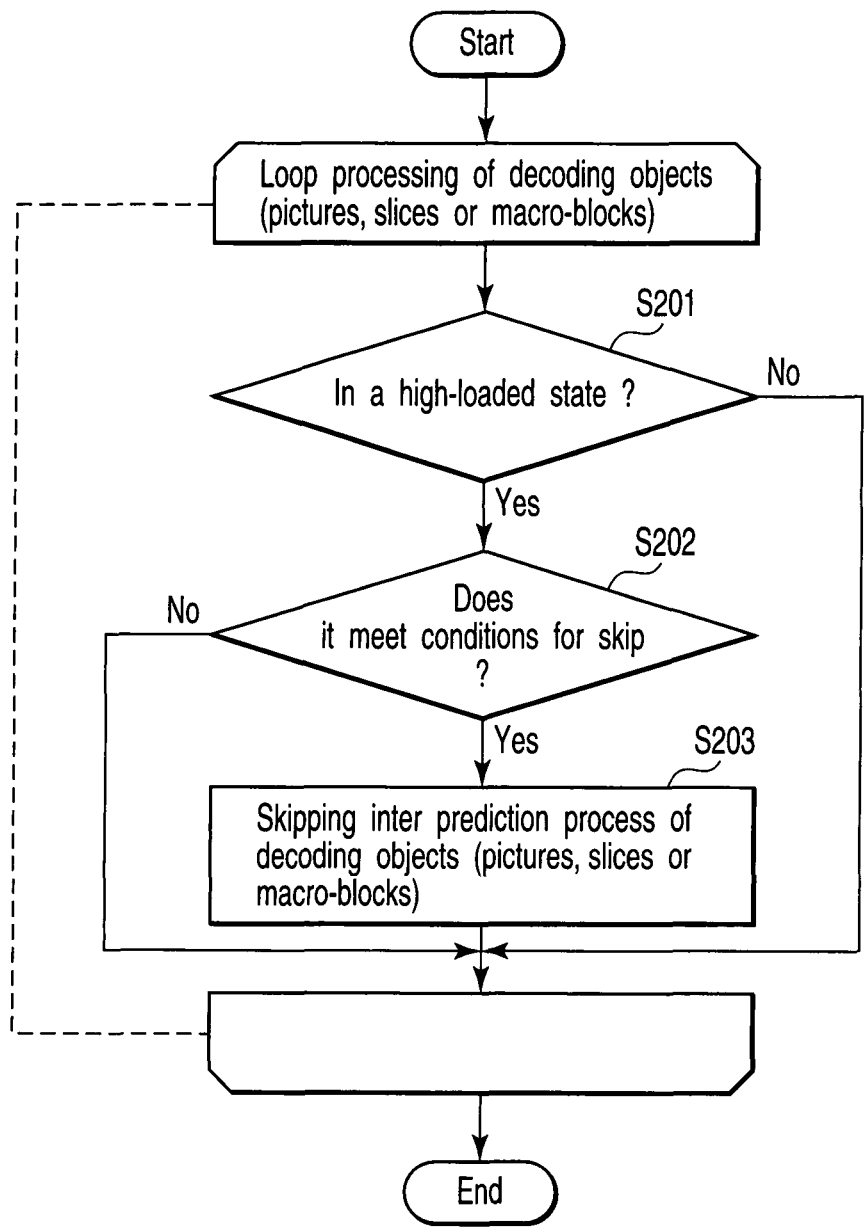
FIG. 7 is a flowchart showing a processing example for simply accomplishing skip determination in an inter prediction skip determining unit in FIG. 4.

FIG. 7 is s flowchart showing a processing procedure for simply accomplishing skip determination. In FIG. 7, when loop processing for the decoding objects (pictures, slices, or macro-blocks) is started, the determining unit 310 determines whether or not the loop processing is in the high-loaded state on the basis of the control information from a load detection unit 402 (S201). If the loop processing is in the high-loaded state, the determining unit 310 determines whether or not it meets the skip conditions (S202). If it does not meet the conditions, the determining unit 310 continues the loop processing as it is, and otherwise stated, the system issues an instruction so as to skip the inter prediction processing of the decoding objects (pictures, slices, or macro-blocks) (S203).

Figure 8:
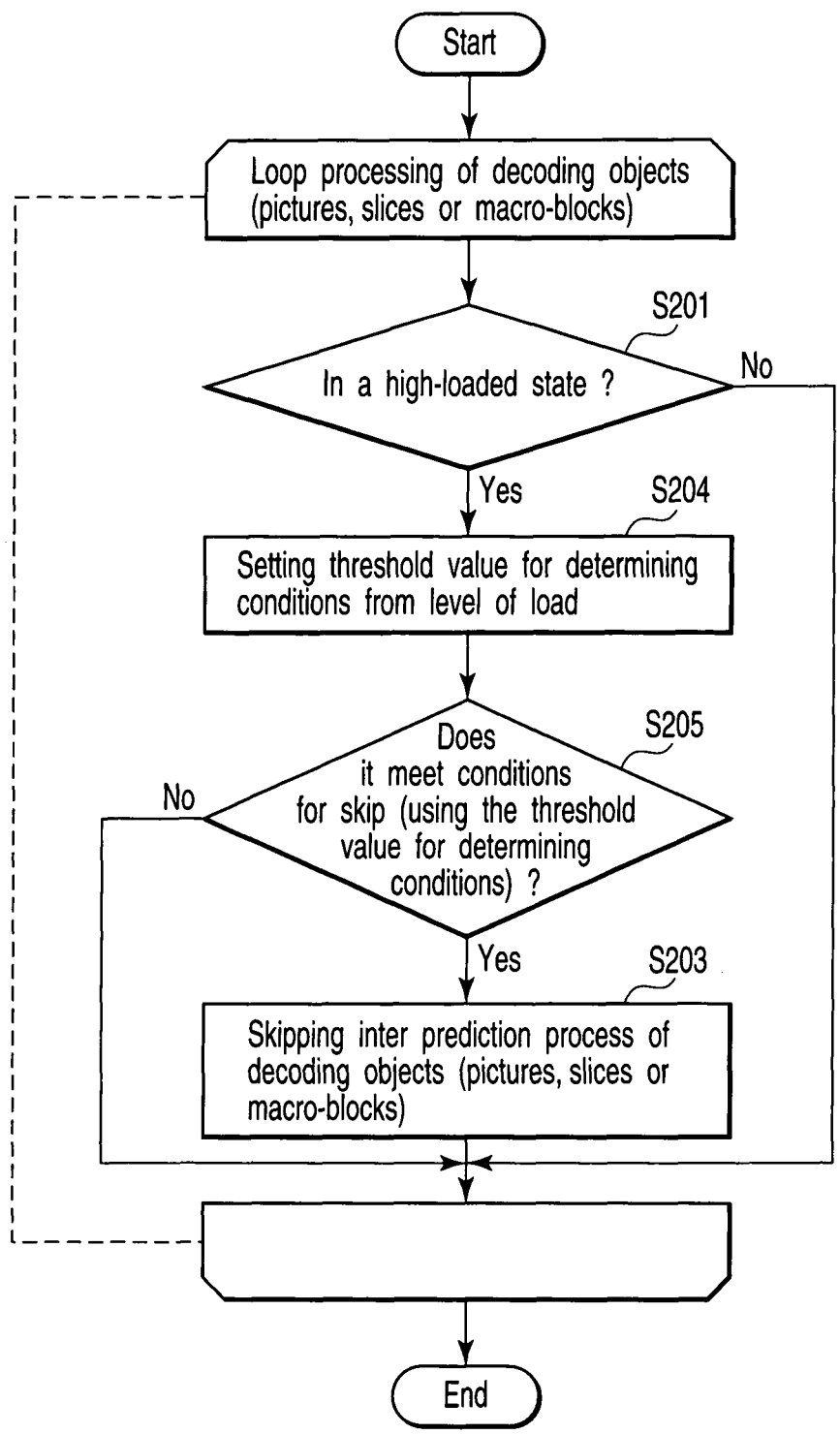
FIG. 8 is a flowchart showing a processing procedure further appropriately performing the skip determination by modifying the processing procedure shown in FIG. 7 in the inter prediction skip determining unit in FIG. 4.

FIG. 8 is a flowchart illustrating a processing procedure for appropriately performing skip determination by modifying the processing procedure shown in FIG. 7. Therefore, in FIG. 8, the same components as those of FIG. 7 are designated by the identical symbols and the components to be characteristics will be described hereinafter.

In FIG. 8, if it is determined that the loop processing is in the high-loaded sate through the determination in the step S201, the determining unit 301 sets a threshold value for determining conditions in accordance with the level of the load (S204) to determine whether or not the loop processing meets the skip conditions by using the threshold value (S205).

Figure 9:
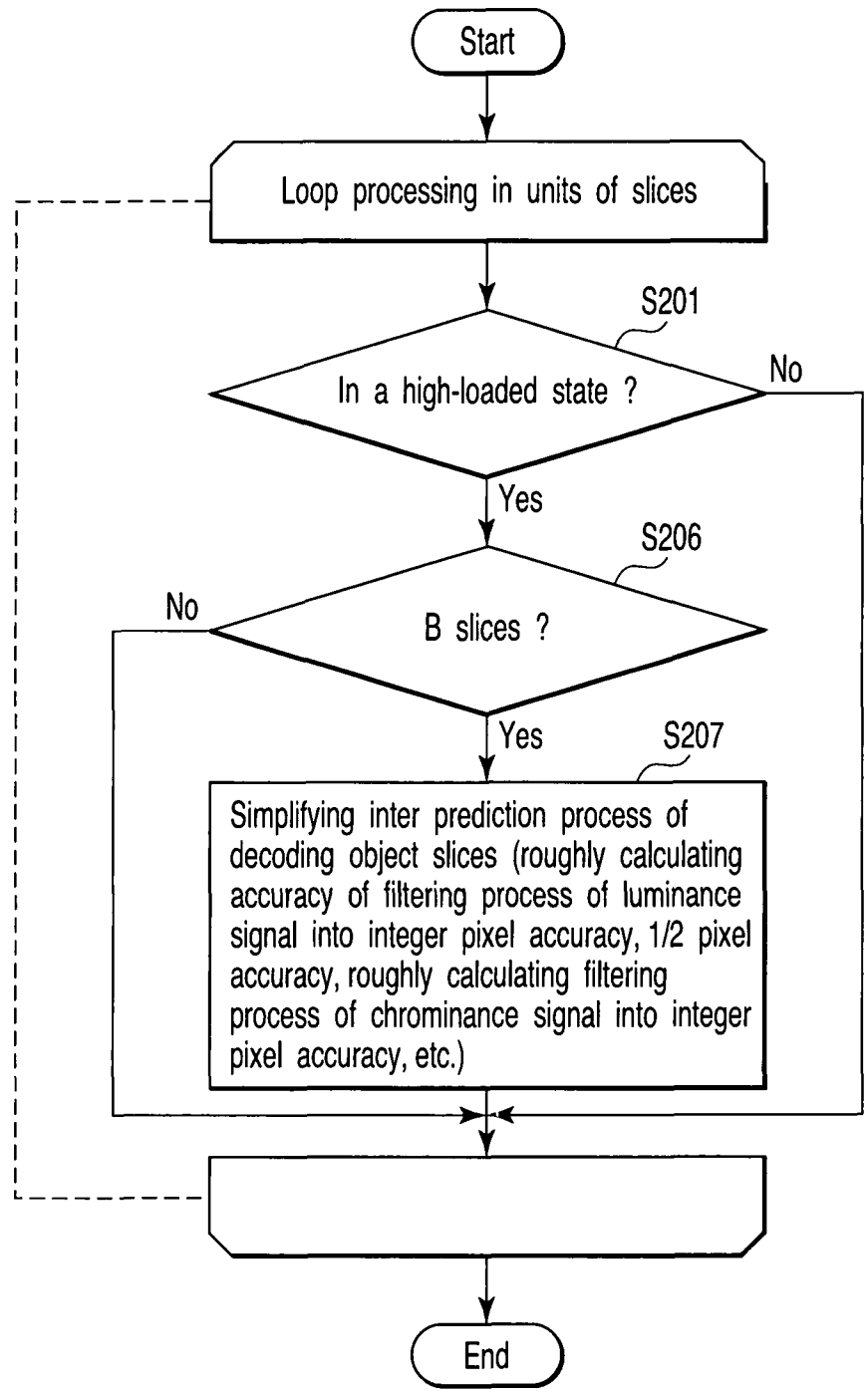
FIG. 9 is a flowchart showing a processing procedure of preferentially simplifying only B slices of B pictures which especially increase processing amounts at an inter prediction unit when loop processing in units of slices is performed in the inter prediction skip determining unit in FIG. 4.

FIG. 9 is a flowchart illustrating a processing procedure for preferentially simplifying only B slices of the B pictures which specifically increases the processing amounts at the inter prediction unit when loop processing in units of slices is implemented. Also in FIG. 9, the same components as those of FIG. 7 are designated by identical symbols, and explanation of those components will be omitted hereinafter.

In FIG. 9, when it is determined that the loop processing is in the high-loaded sate through the determination in the step S201, the determining unit 310 determines whether or not the decoding objects are B slices (S206). If they are not the B slices, the determining unit 310 continues the loop processing as it is. If they are the B slices, the inter prediction processing for the decoding object slices is simplified (S207). As for the method of simplifying, roughly calculating (approximating) a filtering process, of a luminance signal in ¼ pixel accuracy into ½ pixel accuracy and integer pixel accuracy, or roughly calculating (approximating) a filtering process of a chrominance signal in ⅛ pixel accuracy into integer pixel accuracy, is a possible approach.

Figure 10:
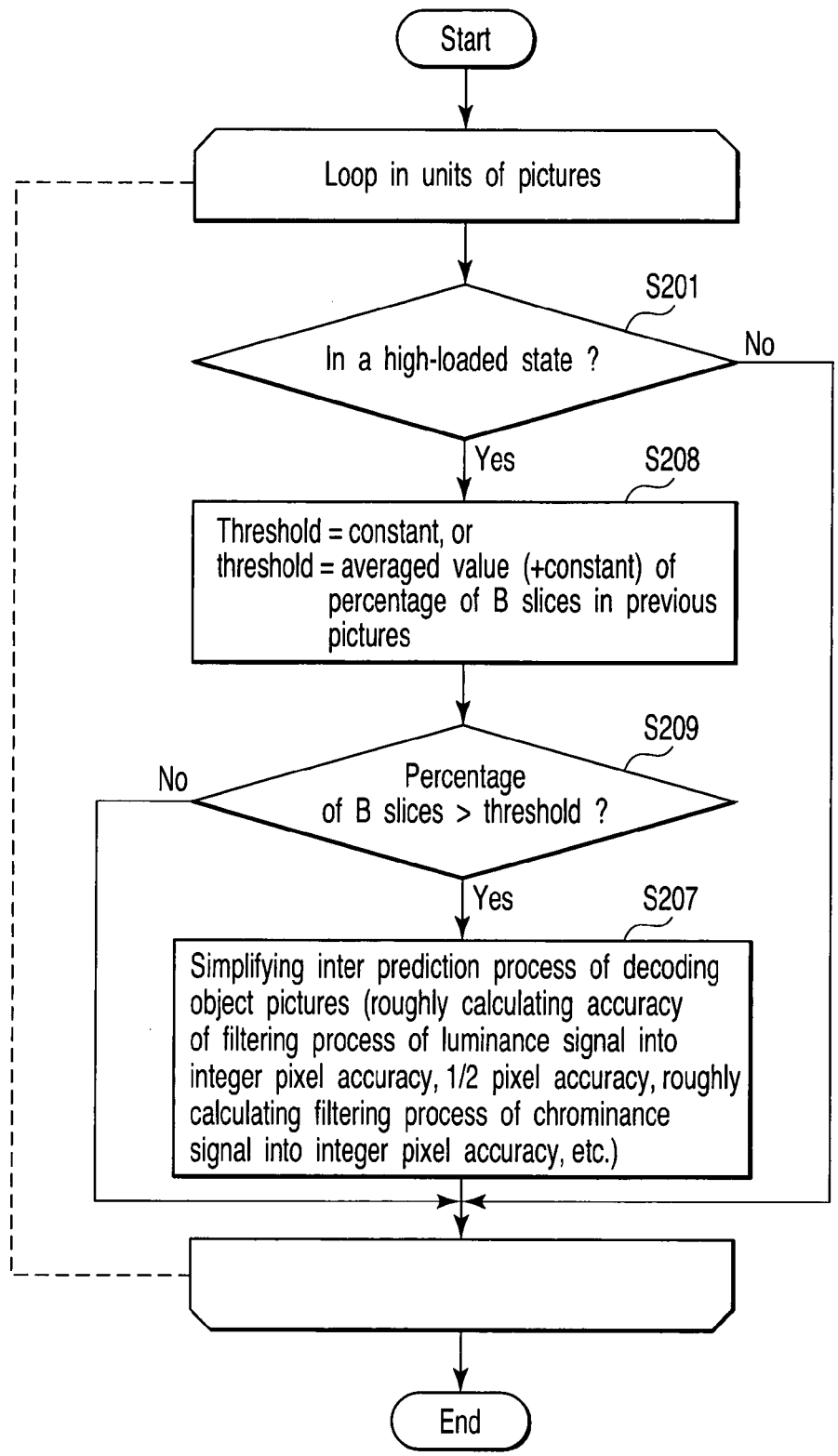
FIG. 10 is a flowchart showing a processing procedure which enables further appropriately simplifying the processing procedure shown in FIG. 5 by modifying the procedure when loop processing in units of pictures is performed in the inter prediction skip determining unit in FIG. 4.

FIG. 10 is a flowchart showing a processing procedure enabling the processing procedure shown in FIG. 9 to be simplified further accurately by modifying the procedure when the loop processing in units of pictures is implemented. Therefore, in FIG. 10, the same components as those of FIG. 7 and FIG. 9 are designated by identical symbols, and components to be characteristics will be described hereinafter.

In FIG. 10, when it is determined that the loop processing is in the high-loaded state through the determination in the step S201, the determining unit 310 sets a threshold value=a constant, or an averaged value (adding a constant if necessary) of a percentage of the B slices of previous pictures from the level of the load (S208), determines whether or not the percentage of the B slices exceeds the threshold value (S209). Only in the case of exceeding, the determining unit 310 simplifies the inter prediction processing of the pictures of the decoding objects (S207).

Figure 11:
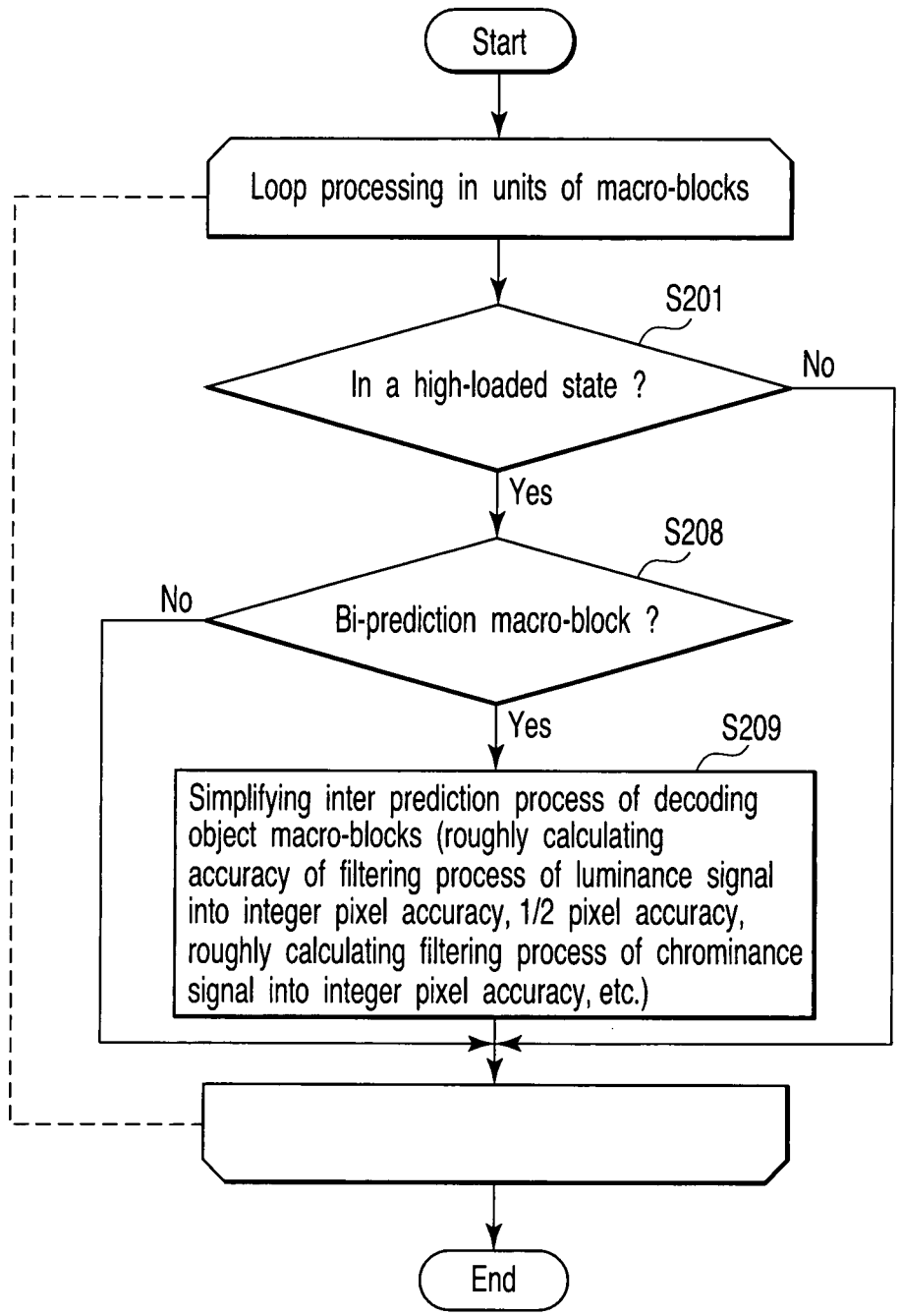
FIG. 11 is a flowchart showing a processing procedure of preferentially simplifying only bi-prediction portions of B pictures which especially increase processing amounts at an inter prediction unit when loop processing in units of macroblocks is performed in the inter prediction skip determining unit in FIG. 4.

FIG. 11 is a flowchart showing a processing procedure in preferentially simplifying only the bi-prediction portions of the B pictures which especially increase the processing amounts of the inter prediction unit when the loop processing is performed in units of macro-blocks. Also in FIG. 11, the same components as those of FIG. 7 are designated by identical symbols, and the explanation for those components will be omitted hereinafter.

In FIG. 11, when it is determined that the loop processing is in the high-loaded state through the determination in the step S201, the determining unit 310 determines whether or not the objects are the bi-prediction macro-blocks (S208). If they are not the bi-prediction macro-blocks, the loop processing is continued as it is. In the case of the bi-prediction macro-blocks, the determining unit 310 simplifies the inter prediction processing of the decoding object macro-blocks (S209). As for the method of simplifying, roughly calculating (approximating) a filtering process of a luminance signal in ¼ pixel accuracy into ½ pixel accuracy and integer pixel accuracy, or roughly calculating (approximating) a filtering process of a chrominance signal in ⅛ pixel accuracy into integer pixel accuracy is a possible approach.

Figure 12:
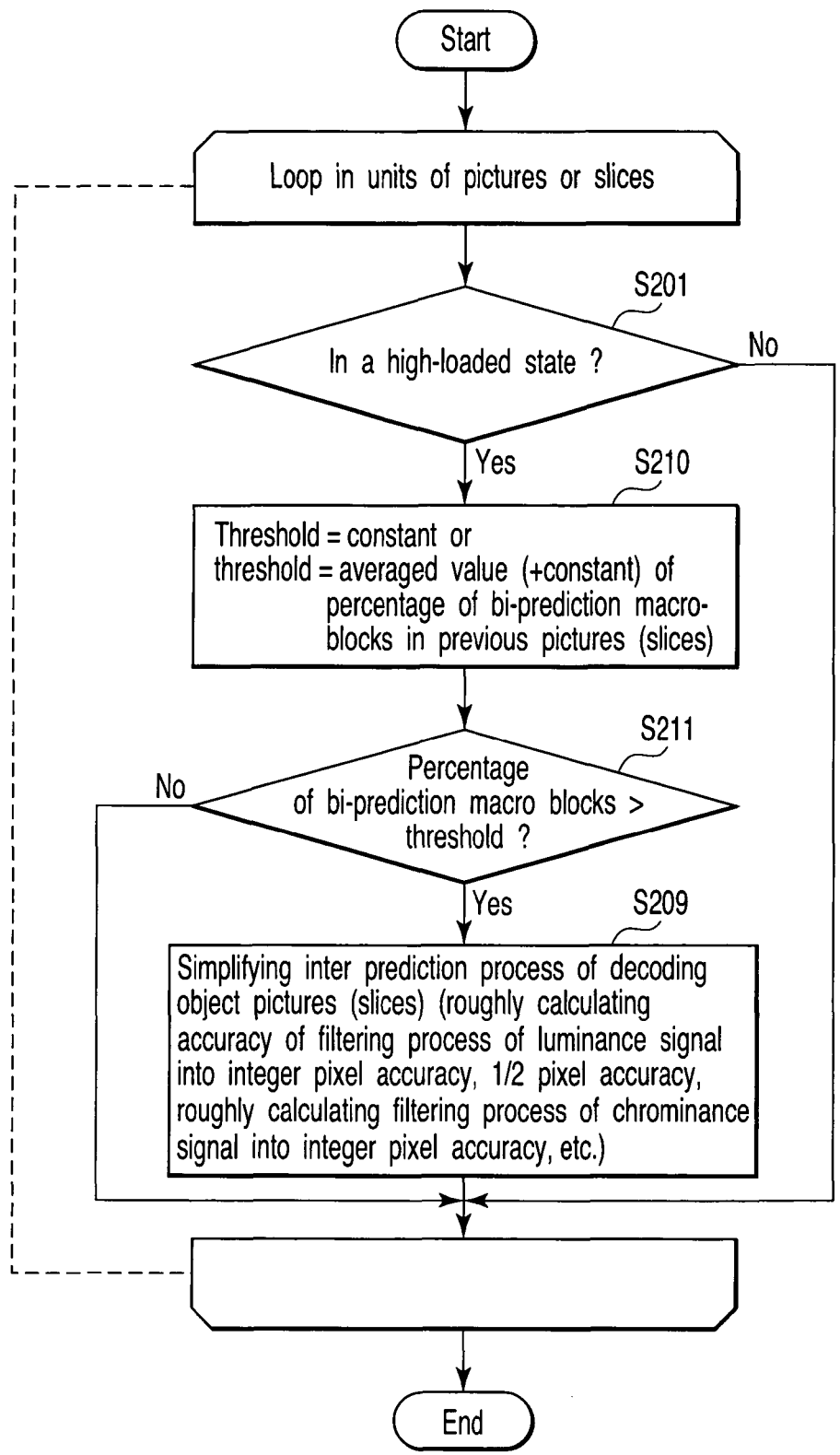
FIG. 12 is a flowchart showing a processing procedure which enables further appropriately simplifying the processing procedure shown in FIG. 11 by modifying the procedure when loop processing in units of pictures (slices) is performed in the inter prediction skip determining unit in FIG. 4.

FIG. 12 is a flowchart showing a processing procedure enabling the processing procedure shown in FIG. 11 to be simplified further accurately by modifying the procedure when the loop processing is implemented in units of pictures. In FIG. 12, therefore, the same components as those of FIG. 7 and FIG. 11 are designated by the identical symbols, the components to be characteristics will be described hereinafter.

In FIG. 12, when it is determined that the loop processing is in the high-loaded state through the determination in the step S201, the determining unit 110 sets a threshold value=a constant, or an averaged value (adding a constant if necessary) of a percentage of the bi-prediction macro-blocks of previous pictures (slices) from the level of the load (S210), determines whether or not the percentage of the bi-prediction macro-blocks exceeds the threshold value (S211), and simplifies the inter prediction processing of the pictures (slices) of the decoding objects only when the percentage exceeds the threshold value (S209).

According to the processing given above, when the processing reduction in the inter prediction is required in the high-loaded state, the determining unit 310 reduces only the spots in which the processing amounts are especially large at the inter prediction unit 306, such that only the B pictures (B slices, bi-prediction portions) which increase the processing amounts at the inter prediction unit 306 in response to the information on the encoding mode of the pictures, slices, or macro-blocks, so that it can reduce the processing amounts while suppressing the deterioration in image quality minimally.

Embodiment

Hereinafter, a method of a step-by-step simplification will be described specifically.

Simplification types are classified roughly into a process for interpolation filtering of a luminance signal and a process for that of a chrominance signal. The interpolation filtering of the luminance signal includes:

(1) Limit the number of steps of the interpolation filtering
(2) Reduce the number of taps of the filter
(3) Select one interpolation in either horizontal direction or vertical direction.

Finely controlling for the interpolation filtering of the chrominance signal not bringing a marked result, it is thought that controlling only by on/off is sufficient.

In particular, interpolation image generation of the luminance signal of the inter prediction increases a processing amount because it generates compensated images by use of filtering processing with six taps, and the processing amount occupies around ⅓ extent of entire decode processing sometimes. Therefore, in the case of being in a high-load state, the decode processing amount is reduced by performing the inter prediction in a simple manner so as to reduce the decode processing amount. Depending on the degree of the load, the processes are reduced by switching step-by-step to a no-filtering process, a filtering process only with a ½ pixel filter, a filtering process with a small number of taps, etc. Hereinafter, the filtering processes will be mentioned by giving specific examples.

Figure 13:
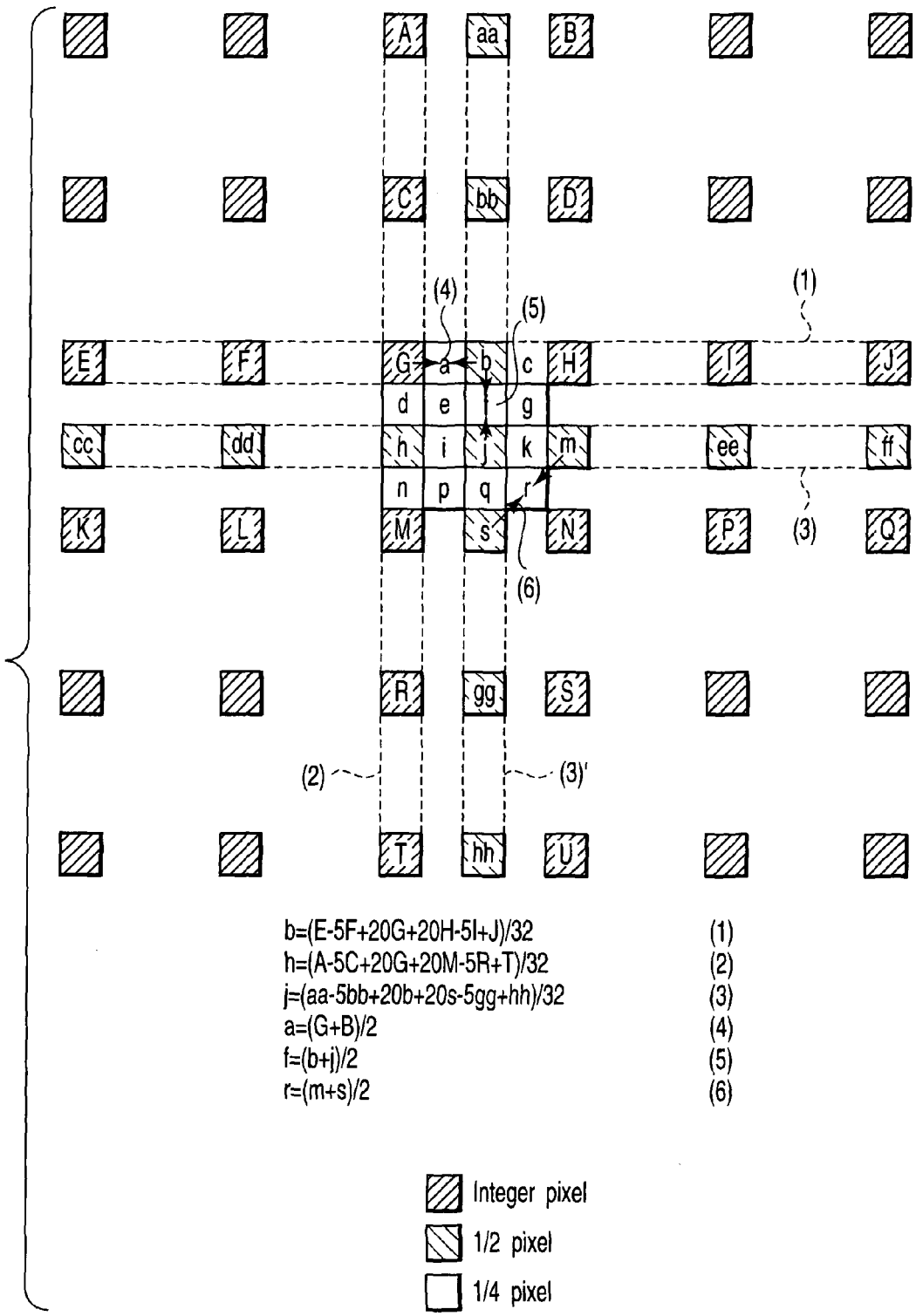
FIG. 13 is a schematic view showing aspects of filtering processes in generating inter prediction signals.

FIG. 13 shows an aspect of a filtering process in generating the inter prediction signal. Provisional pixels b, h, m and s, of either of which the horizontal direction or vertical direction are present at the ½ pixels, respectively, are generated from integer pixels (A, B, C, etc.) by applying direct ½ pixel filtering. A provisional pixel j, of both of which horizontal and vertical directions are present at the ½ pixel, generates provisional pixels aa, bb, cc, etc., from the integer pixel by applying the ½ pixel filtering, and generates those pixels by further applying the ½ pixel filtering. Provisional pixels a, c, e, f, g, etc., present at the positions of the ¼ pixels are generated by applying the ¼ pixel filtering to the integer pixels and ½ pixels. That is, the values of the provisional pixels b, h, j, a, f, and r are typically obtained by the following equations.

$$b=(E-5F+20G+20H-5I+J)/32 \quad (1)$$

$$h=(A-5C+20G+20M-5R+T)/32 \quad (2)$$

$$j=(aa-5bb+20b+20s-5gg+hh)/32 \quad (3)$$

$$a=(G+b)/2 \quad (4)$$

$$f=(b+j)/2 \quad (5)$$

$$r=(m+s)/2 \quad (6)$$

FIG. 14 is a flowchart illustrating a processing procedure of a determining process of an integer pixel (S301), a ½ pixel filtering process S401, and a ¼ pixel filtering process S501, as ordinary decode processing for processing contents shown in FIG. 13. In FIG. 14, at first, when it is determined that the pixel is not the integer pixel in the determining step thereof (S301), the ½ pixel filtering process S401 conducts processing by the use of the ½ pixel horizontal six taps filter for pixel positions present at b and s, by the use of the ½ pixel vertical six taps filter for pixel positions present at h and m, and by the use both ½ pixel horizontal and vertical six taps filters for pixel positions present at j.

Next, the ¼ pixel filtering S501 performs processes, without using any filter when the pixel positions are present at b, h and i, by using the ¼ pixel horizontal two taps filter when the pixel positions are present at a, c, i, and k, by using the ¼ pixel vertical two taps filter when the pixel positions are present at d, n, f, and q, and by using a ¼ pixel slanted two taps filter when the pixel positions are present at e, g, p, and r.

Figure 15:
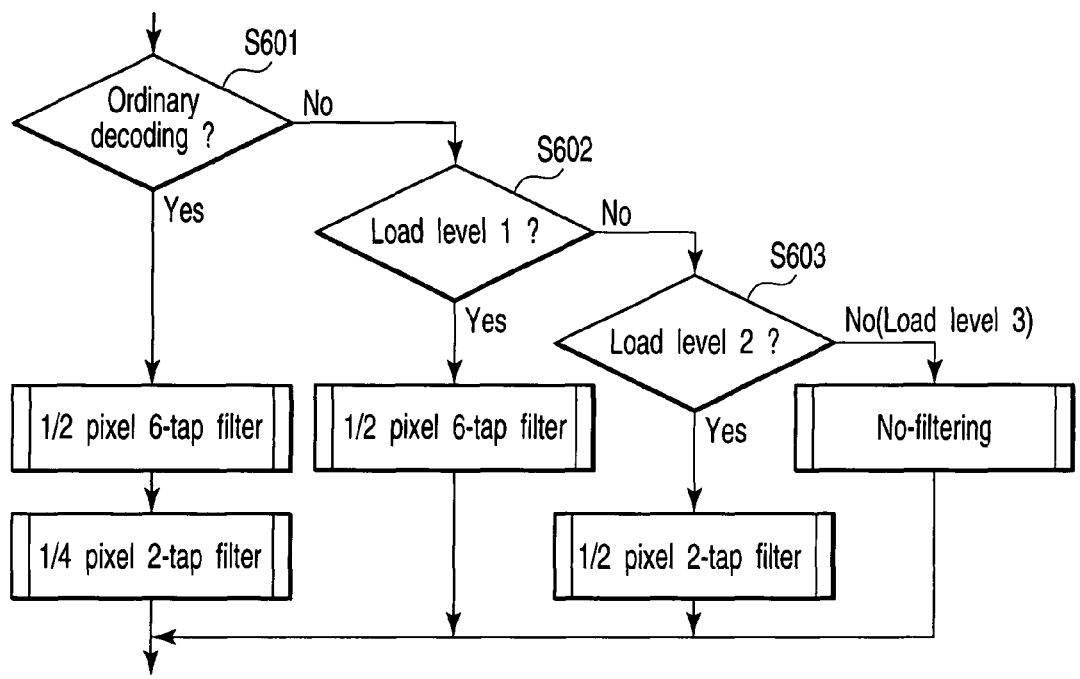
FIG. 15 is a flowchart showing a first embodiment in decreasing filtering processes and the number of taps in response to load levels for the ordinary decoding process in FIG. 14.

FIG. 15 is a flowchart showing a first embodiment when reducing the filtering processes and the number of taps in response to the load level to the foregoing ordinary decoding processes.

In FIG. 15, when it is determined that the processing is the ordinary decoding in a step S601, the ½ filtering process and the ¼ filtering process are performed through the ½ pixel six taps filter and ¼ pixel two taps filter, respectively. If it is determined that the load level is load level 1 in a step 602, the first embodiment skips only the ¼ pixel filtering process by using only the ½ pixel six taps filter (the same processing for ½ pixel). When it is determined that the load level is load level 2 in a step 603, the number of taps is decreased by the use of the ½ pixel two taps filter. Further, in the step 603, determination of the load lever as load level 3 skips the filtering process (the same processing for integer pixel).

Figure 16:
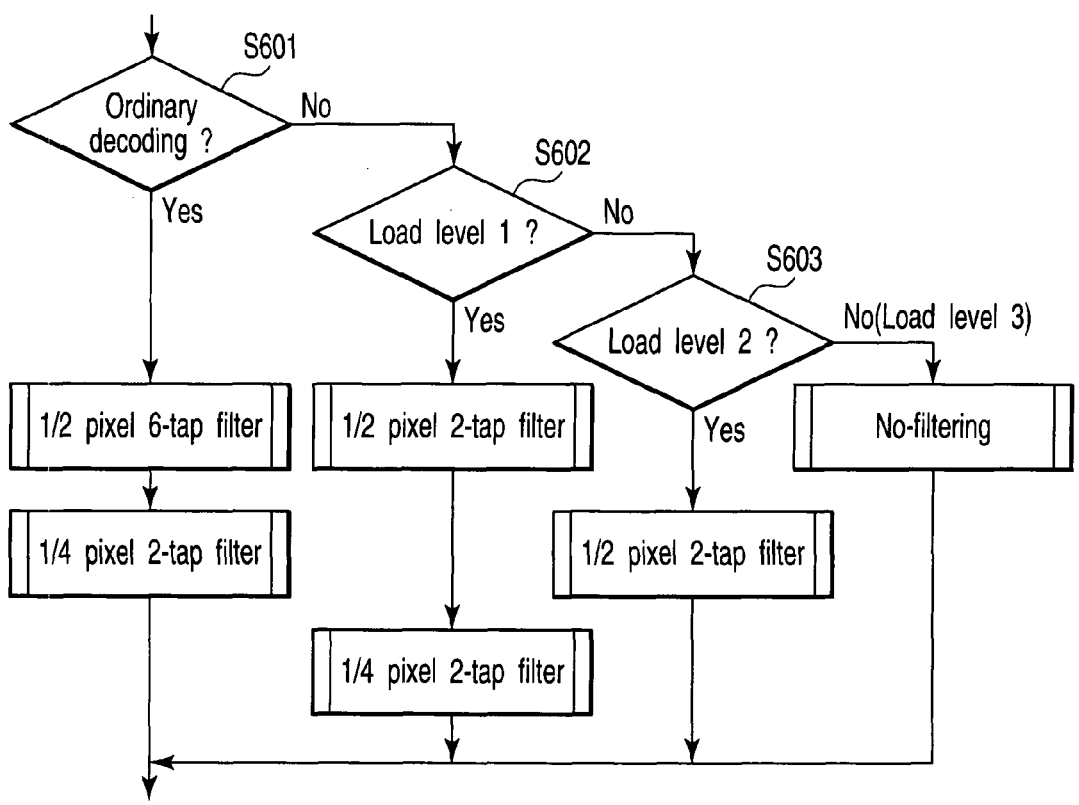
FIG. 16 is a flowchart showing a second example in decreasing the filtering processes and the number of the taps in response to load levels for the ordinary decoding process in FIG. 14.

FIG. 16 is a flowchart illustrating a second embodiment in the case of reducing filtering processes and the number of taps in response to load level to the aforementioned ordinary decoding processing. The second embodiment differs from the first embodiment in reducing the number of the taps by using the ½ pixel two taps filter and executing the ¼ filtering process by using the ¼ pixel two taps filter when the step S602 determines that the load level is the load level 1.

Figure 17:
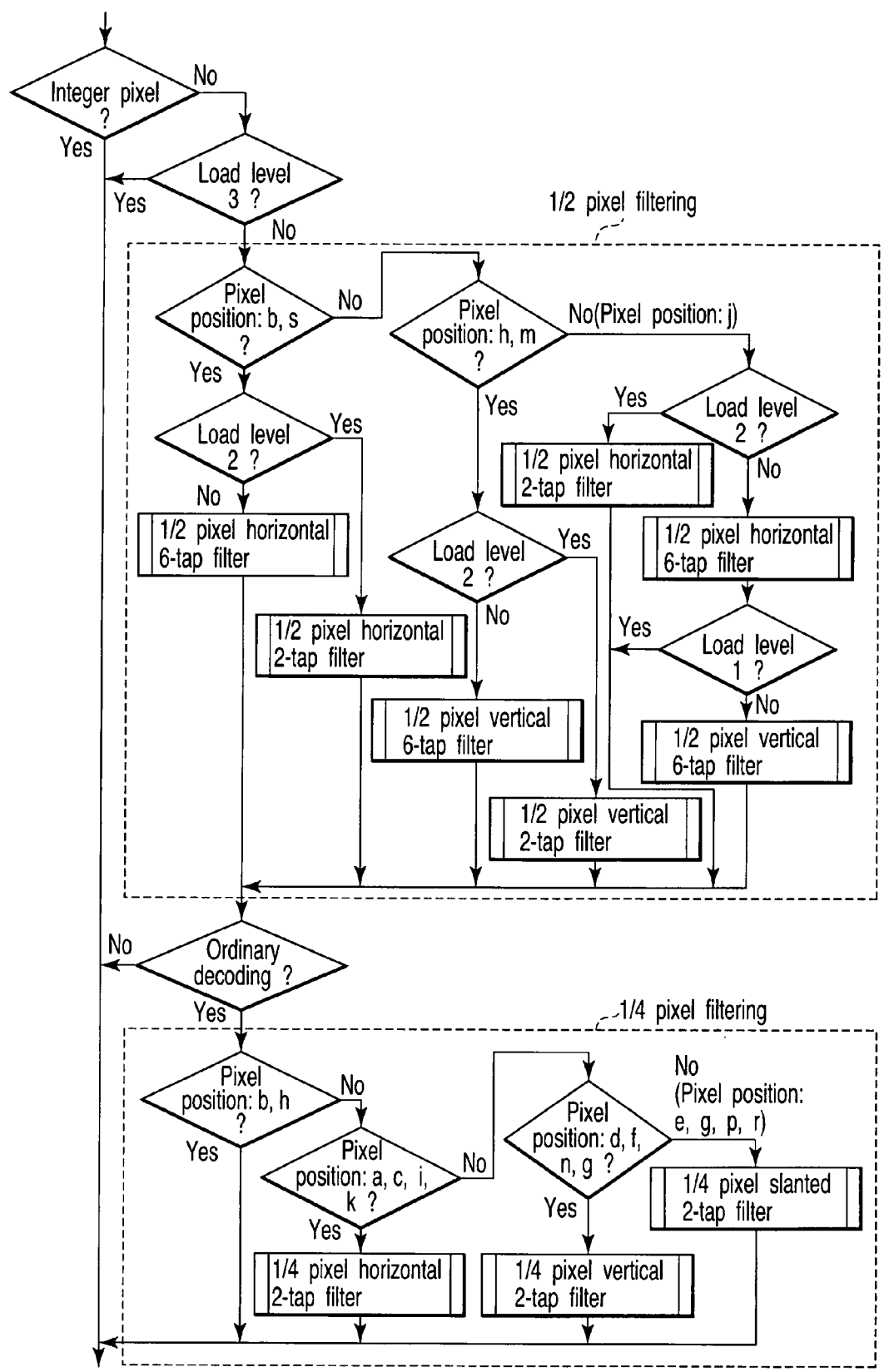
FIG. 17 is a flowchart showing a third example in decreasing the filtering processes and the number of the taps in response to load levels for the ordinary decoding process in FIG. 14.

FIG. 17 is a flowchart showing a third embodiment for reducing the filtering processes and the number of the taps in response to the load level to the foregoing ordinary decoding processing. The flowchart in this embodiment shows the processing procedure to skip the filtering process in a vertical direction only for the pixel position j to which six taps filtering processing is applied twice in a horizontal/vertical direction among ½ pixel interpolations in the load level 1. The others going same as that of the first embodiment, the explanation for the others will be eliminated hereinafter. In the aforementioned embodiments, configuration examples which inputs a load level together with a motion vector in the inter prediction unit to decide interpolation filtering process to simplify itself in response to the load level in the inter prediction unit having described, roughly calculating the accuracy of the motion vector to be input to the inter prediction by the inter prediction skip determining unit also enables simplification in a similar manner.

For example, if it is determined that the load level is the load level 1, the third embodiment can skip the ¼ pixel filtering process like the case in which the load level is determined as the load level 1 in the step S602 in FIG. 15, by roughly calculating the accuracy of the motion vector into the ½ pixel accuracy. If the load level is determined as the load level 3, roughly calculating the accuracy of the motion vector into the integer pixel accuracy enables the filtering process to be skipped like the case in which the load level has determined as the load level 3 in the step S603 in FIG. 15.

If the accuracy of the motion vector is the ½ pixel accuracy both in the horizontal and vertical components, roughly calculating the accuracy of the vertical component into the integer pixel accuracy allows only the pixel position j to be skipped its filtering process in the vertical direction like the case in which the load level is determined to be the load level 1 in FIG. 17.

The Rough calculation of the motion vector of a chrominance signal into the integer pixel accuracy makes it possible to skip the interpolation filtering of the chrominance signal.

Thereby, without changing the configuration of the interpolation filtering process of the inter prediction, the interpolation filtering can be simplified. For instance, in performing the interpolation filtering processes among a plurality of sets of hardware such as a graphics controller, roughly calculating in advance the accuracy of the motion vector necessary for the interpolation filtering enables simplifying the interpolation filtering without changing the contents of the hardware.

Applying the processing procedure given above enables appropriately reducing the filtering processes and the number of taps in the inter prediction processing in response to the load level to effectively reduce the computing amounts while suppressing the deterioration in image quality, and thereby, enables contributing to the reduction in load.

The present invention may be accomplished not only as the video decoding method mentioned above but also as a video decoding method including characteristic steps as means included in such a video decoding method. The invention may be also achieved as a program to make a computer execute these steps. Such a program can be distributed through a recording medium such as a CD-ROM and a transmission medium such as the Internet.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processing apparatus which includes a video decoding processing to decode a compressed and encoded video image stream by software, and a control process based on load information and battery driving information, comprising:
  a prediction decoding unit which selectively generates one of an intra prediction image and an inter prediction image based on an encoding mode of a decoding object from the video stream and decoded images thereof;
  a residual decoding unit which generates a residual decoded image based on a quantization parameter of a decoding object from the video stream;
  an adding unit which generates a decoded image by adding one of an intra prediction image and an inter prediction image selectively generated by the prediction decoding unit, and a residual decoded image generated by the residual decoding unit;
  a filter process unit which applies deblocking filter process for reducing a block distortion onto a decoded image generated by the adding unit;
  a determining unit which determines whether or not a current processing load is high, and which extracts, if it is determined that the current processing load is high, information on an encoding mode from the video stream to determine whether or not inter prediction processes for generating the inter prediction image should be simplified on the basis of the extracted information and the load information; and
  a switching unit which selectively switches whether the determining unit and a simplifying unit should be enabled or disabled,
  wherein the determining unit sets a threshold value to be a reference of determination from a load level to determine the simplification, based on a result of comparison to the threshold value, and
  wherein the threshold value uses an average value of the decoding object in decoded previous pictures or slices or uses a value obtained by adding an offset value to the average value.

2. The information processing apparatus according to claim 1, wherein the switching unit disables the determining unit and the simplifying unit in being driven by commercial power on the basis of the battery driving information, and automatically enables them in being driven by a battery on the basis of information on a battery remaining quantity.

3. The information processing apparatus according to claim 1, wherein the determining unit determines that the inter processing should be simplified when it is determined that the decoding object is one of a picture, a slice, or a macro-block from the information on the encoding mode and is in a high-loaded state.

4. The information processing apparatus according to claim 1, wherein the decoding object uses percentages of B slices in loop processing in units of slices and of B slices in loop processing in units of pictures, and percentages of bi-prediction macro-blocks in loop processing in units of macro-blocks and of bi-prediction macro-blocks in loop processing in units of pictures or slices.

5. The information processing apparatus according to claim 1, wherein the simplifying unit skips filtering processes step-by-step.

6. The information processing apparatus according to claim 5, wherein the simplifying unit skips filtering processes step-by-step by roughly calculating accuracy of a motion vector step-by step.

7. The information processing apparatus according to claim 1, wherein the simplifying unit skips the number of taps of a pixel filter step-by-step.

8. The information processing apparatus according to claim 1, wherein the simplifying unit skips one of a vertical pixel filtering process and a horizontal pixel filtering process.

9. The information processing apparatus according to claim 8, wherein the simplifying unit skips one of the vertical pixel filtering process and the horizontal pixel filtering process by roughly calculating accuracy of one of a vertical and a horizontal components of a motion vector.

10. The information processing apparatus according to claim 1, wherein the simplifying unit turns on and off a filtering process of a chrominance signal.

11. The information processing apparatus according to claim 10, wherein the simplifying unit turns on and off the filtering process of the chrominance signal by roughly calculating accuracy of a motion vector of the chrominance signal.

12. A video decoding method for being used for an information decoding apparatus and for decoding a video stream which has been compressed and encoded, comprising:

selectively generating one of an intra prediction image and an inter prediction image on the basis of an encoding mode of a decoding object from the video stream and a decoded image thereof;

generating a residual decoded image based on a quantization parameter of a decoding object from the video stream;

generating a decoded image by adding one of an intra prediction image and an inter prediction image selectively generated, and the residual decoded image;

applying a deblocking filter process for reducing a block distortion onto the decoded image;

determining whether or not a current processing load is high;

extracting, if it is determining that the current processing load is high, information on an encoding mode from the video image stream to determine whether or not the inter prediction processes for generating the inter prediction image should be simplified;

simplifying the inter prediction process step-by-step on the basis of the result of the determination; and selectively switching whether the processing of the determination and the simplification should be enabled or disabled, wherein the determining of the current processing load includes setting a threshold value to be a reference of determination from a load level to determine the simplification based on a result of comparison to the threshold value, and wherein the threshold value uses an average value of the decoding object in decoded previous pictures or slices or uses a value obtained by adding an offset value to the average value.

13. The video image decoding method of the information processing apparatus according to claim 12, wherein the determining and the simplifying processes are brought into a disabled state in being driven by commercial power, and automatically switched into an enabled state in being driven by a battery on the basis of battery remaining quantity information.

\* \* \* \* \*